June 19, 1956 R. COLOMBO 2,750,625
APPARATUS FOR CONTINUOUS MOULDING OF SYNTHETIC RESINS
Filed March 5, 1951 7 Sheets-Sheet 1

Inventor
Roberto Colombo
By
Haseltine, Lake & Co.
Agents

June 19, 1956　　　　　R. COLOMBO　　　　2,750,625
APPARATUS FOR CONTINUOUS MOULDING OF SYNTHETIC RESINS Filed March 5, 1951　　　　　　　　　　　　7 Sheets-Sheet 4

INVENTOR
ROBERTO COLOMBO
By:
Haseltine, Lake & Co.
AGENTS

June 19, 1956  R. COLOMBO  2,750,625
APPARATUS FOR CONTINUOUS MOULDING OF SYNTHETIC RESINS
Filed March 5, 1951  7 Sheets-Sheet 5

INVENTOR
ROBERTO COLOMBO
By: Hazeltine, Lake & Co.
AGENTS

June 19, 1956   R. COLOMBO   2,750,625
APPARATUS FOR CONTINUOUS MOULDING OF SYNTHETIC RESINS
Filed March 5, 1951   7 Sheets-Sheet 6

INVENTOR
ROBERTO COLOMBO
By: Haseltine, Lake & Co.
AGENTS

United States Patent Office 2,750,625
Patented June 19, 1956

2,750,625

APPARATUS FOR CONTINUOUS MOULDING OF SYNTHETIC RESINS

Roberto Colombo, Turin, Italy, assignor to Royal Manufacturing Company, Inc., a corporation of Arizona Application March 5, 1951, Serial No. 213,814

6 Claims. (Cl. 18—5)

Methods and apparatus for blowing synthetic, more particularly thermoplastic resins for manufacturing hollow moulded articles, such as bottles, containers, flasks, handles for umbrellas, etc. are known. In accordance therewith, compressed air or gas is injected into a tube section of plastic material brought to softening temperature and closed at one end in order to cause said section to swell till it accurately fits against a mould, which has been placed around it, whereupon the tube section is allowed to set as it is kept under pressure and simultaneously cooled.

With these known methods hollow articles of variable thickness and size may be manufactured, for both size and thickness may be varied at will by varying the diameter, thickness and length of the tube of artificial resin or the like, from which the final product is to be obtained. It is immaterial whether the tube section is prepared on an injection machine for thermoplastic or on an ordinary extrusion press which is stopped when the tube section of the desired size has been formed. Further finishing steps consist in removing the head through which the air has been blown and pinching the tube at one end for closing it in order to obtain a hollow body which may accurately fit the mould walls under the action of compressed air.

It will appear obvious that the above method of manufacture suffers from various drawbacks. In fact, the operation is necessarily intermittent, with considerable loss of time between manufacture of successive articles. This is the most serious disadvantage of the known method, for frequent starting and stoppage is required, and considerable waste arises in finishing the articles. Loss of time is still further increased owing to the necessity of allowing the blown material to cool adequately and, in some cases, cooling should take place slowly and gradually in order to avoid internal stresses which would be detrimental to the toughness of the finished article.

A further disadvantage resides in the fact that some thermoplastic materials, such as for instance polystyrol resin materials, cannot be extruded and maintained at a certain temperature at a given size diameter and thickness without a suitable stretching, so that they tend on issue from the die or injection pre-forming mould to undergo variations in size, and generally shrink in length with a certain elasticity inherent to the material itself. This drawback inherent to some materials prevents use thereof in blowing hollow articles generally, or considerably complicates the apparatus required therefor.

An object of this invention is to provide a method of continuously and automatically manufacturing hollow bodies of any size and thickness from any desired synthetic resin, which fully eliminates the abovementioned drawbacks. My improved method eliminates lost times and cooling periods, thereby enormously increasing capacity and making manufacture fully automatic, the only limitations to production being the selected overall size of the apparatus and production and preparation of the semi-finished product adapted to be blown.

The method is based upon the following principle.

A tube of suitable diameter and thickness according to the desired final product is continuously produced on an extrusion press. In proximity to the extrusion die, but separately from the latter, a tube section is seized through suitable mechanisms by a divided mould of the desired shape, made up of two or more parts, the tube being simultaneously closed and throttled at both ends at the extrusion temperature. The mould enclosing the tube section is removed from the extrusion press at a speed equalling the extrusion speed, while a further mould is prepared for receiving a further tube section. The mould travels further as a hollow needle, through which a compressed gas may flow, is forced into the tube at the joint between the mould parts or substantially in the direction of the semi-finished tube axis. The needle should reach beyond the crushed tube section at which the tube has been closed and throttled. Thereupon a pressure gas is caused to flow through the needle and causes the plastic material to expand till it accurately fits the mould walls. Upon cooling of the material in contact with the mould walls, the gas pressure is relieved, the needle is withdrawn, the mould is opened and the article removed therefrom. The mould may be re-cycled.

It will be obvious that by utilizing a number of moulds, the various steps may be accelerated to a very high limit and production enormously increased, the only limit being the capacity of the extrusion press. Manufacture may be made fully automatic.

The very small puncture left by the needle may be closed subsequently, if necessary. When articles with an opening are manufactured, a portion of the finished articles has to be removed for leaving a mouth, and in that case the puncture is made in the portion to be removed.

Further features and advantages of the method and means for carrying it out, which fall within the scope of my invention, will appear from the following specification in which reference is made to the accompanying diagrammatic drawings, wherein:

Figure 23 a, b and c shows a part of the machine in three different positions.

Referring to Figures 1 to 4, 1 denotes the framework of the machine, in which a shaft 2 is rotatably mounted and carries a worm wheel 3 receiving motion from a worm screw 4 actuated in turn by a motor over a change speed gear not shown for the sake of simplicity.

The shaft 2 has keyed thereon a hub 5a of an annular disc 5, carried by spokes 5b. The disc 5 has fixed thereto by means of bolts 6 a set of equidistant plates 7, each plate being fixedly connected with a mould half 8, supported by rollers 9 travelling on the periphery of a rim 10 carried by the framework 1. 11 denotes the mould halves cooperating with the mould halves 8. Each mould 11 is provided with two pins 12 on which slide the ends 13 of rocker arms 14. The arm ends 13 are pushed towards nuts 16 screwed on the pins 12 by springs 15. Each arm 14 is keyed on a shaft 17 rotatably mounted in a structure 18 bolted on the disc 5. Each shaft 17 carries a toothed wheel 19 meshing with a rack 20 vertically sliding in the structure 18. Each rack is fixedly connected to a rod 21 on the end of which rotates a roller 22, riding on a cam 23 carried by the framework 1. A spring 24 bearing at one end on the structure 18 and at its other end on a collar 21a on the rod 21 holds the roller 22 in contact with the cam and a stop 25 carried by the structure 18 limits the rack stroke.

Each half-mould 11 has fixed thereto a support 26 to which is pivotally attached at 27 a bell crank lever 28a, 28b. The top arm 28a carries a roller 29, while the bottom arm 28b of forked shape carries two slots 28c for coaction with a needle support member 31 which is reciprocable in a slideway 26b rigid with the support 26, as hereinafter described in detail. The member 31 has an axial bore 31a communicating with the bore of a hollow needle 32 guided in a hole in the support 26 coaxial with the axis of the chamber K confined between the two mould halves 8, 11. A cross tube 31b connects with the conduit 31a and is attached to a hose 33 for feeding a compressed fluid, generally air. The lever 28a, 28b can take two particular positions, that is, the position shown in Figure 3, in which the needle 32 reaches over a certain length into the chamber K, and another position in which the needle 32 is completely out of the chamber K and the roller 29 takes the position 29' shown in dotted lines in Figure 3. The needle 32 is maintained in the position shown in Figure 3 by the action of spring 34 surrounding a stud 35, a projection of which extends through a hole 38 in the lever 28a. The stud 35 is formed with a conical top portion 36 and a cylindrical head 37 extending, in the position 38 shown in Figure 3, through a hole 38 in the arm 28a.

Figures 3, 3A:
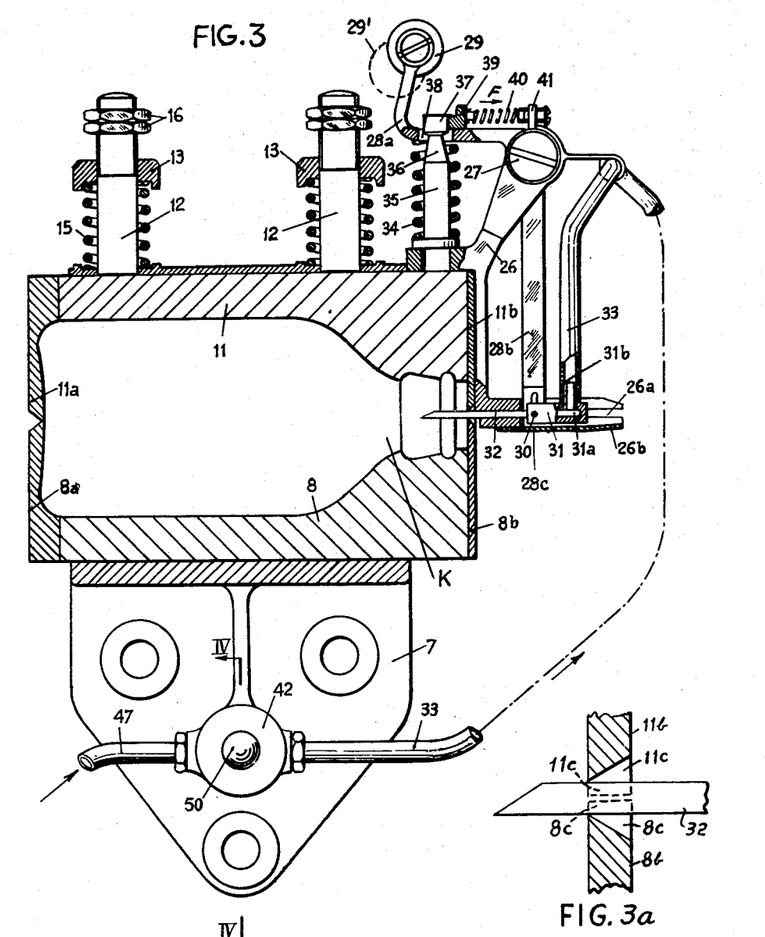
Figure 3 is a section on an enlarged scale on line III—III of Figure 2.
Figure 3a is an enlarged view of part of Figure 3.
Figure 19:
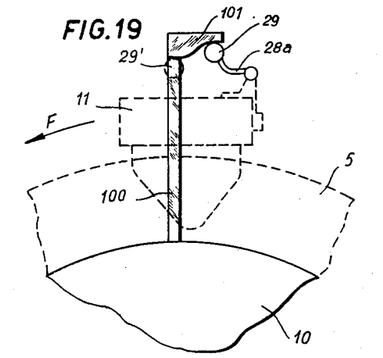
Figures 19, 20, 21, 22, 22a show details of the machine.
Figures 20, 22A:
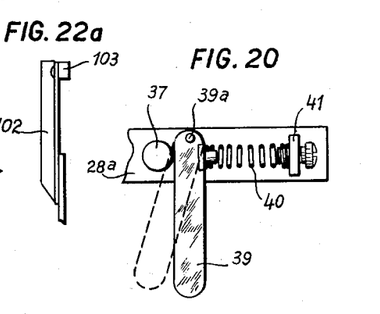

Displacement of the lever 28a, 28b from the position shown in Figure 3 to the position in which the needle 32 is completely extracted from the chamber K, is effected by bringing the roller 29 to the position 29' shown in dotted lines in Figure 3. The stationary rim 10 is provided (Figure 19) for this purpose with a projection 100 having fixed thereto a rail 101 of the shape shown in Figure 19. On rotation in the direction of the arrow F the disc 5 brings the roller 29 against the rail 101, moving said roller to the position 29'. Roller 29 is maintained in the position shown in dotted lines, corresponding to the position of lever 28a, 28b in which the needle 32 is out of the chamber K, by the stop lever 39 pivoted to a pin 39a secured to the lever 28a (Figure 20). Under the action of spring 40 the lever is displaced to the position shown in Figure 21.

Figure 21:
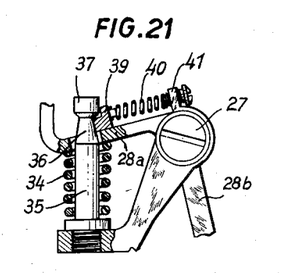
Figure 22:
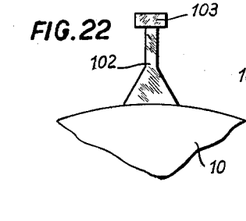
Figure 23A:
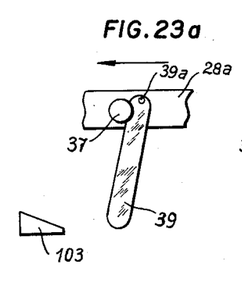
Figure 23B:
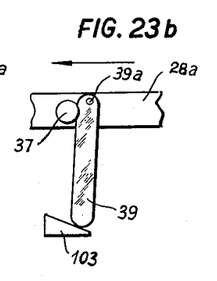
Figure 23C:
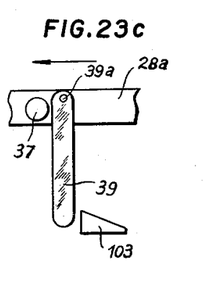

The return of lever 39 from the position shown in Figure 21 and in dotted lines in Figure 20, is effected in the following manner: the fixed rim 10 (Figure 22) is provided with a projection 102 having fixed thereto a rail 103 (Figure 22a) which, on movement of the disc 5 in the direction of the arrow F, engages the free end of stop lever 39 and returns it from the position shown in dotted lines in Figure 20 to the position shown in full lines, thereby disengaging the head of the stud 35 and permitting the return of lever 28a—28b to the position shown in full lines in Figure 3. It will be obvious from the above that in operation the free end of the arm 28b of the bell crank lever 28a, 28b moves in an arc while it is necessary for the needle 32 to be introduced into the blank by a movement parallel with the blank axis substantially coinciding with the axis of the mold 8, 11. For this purpose the support 31 for the needle 32 is provided with a crosspin 30 which is guided at its end within opposite slots 26a in the element 26b. On the drawing one slot only is visible. The pin 30 receives movement from the end of the arm 28b formed with slots 28c engaging the ends of the pin 30 for driving purposes, but permitting the needle 32 to move along a straight line along the mold axis by effect of the guide slots 26a.

Each support 7 carries a valve casing 42 having formed therein two chambers 43, 44 which are provided with a connection 45 for the hose 33 and with a connection 46 for a hose 47, respectively. The two chambers communicate together through a valve 48 of which the stem 49 carries a ball 50 bearing on a cam-shaped control surface 51 carried by the rim 10. Each hose 47 extends radially and communicates with an internal chamber 52 in the shaft 2, closed in front by a plug 53 provided with a packing 54. The plug 53 is provided with a connection 55 for a pressure fluid supply pipe, from a compressor not shown.

Figure 1:
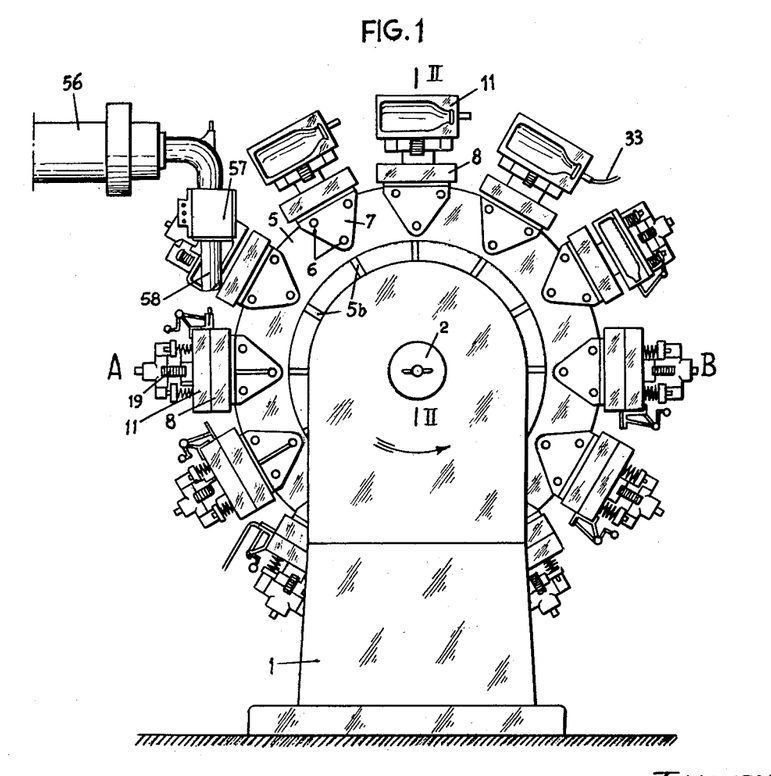
Figure 1 is a front view of a machine for carrying out the method.
Figures 2, 4:
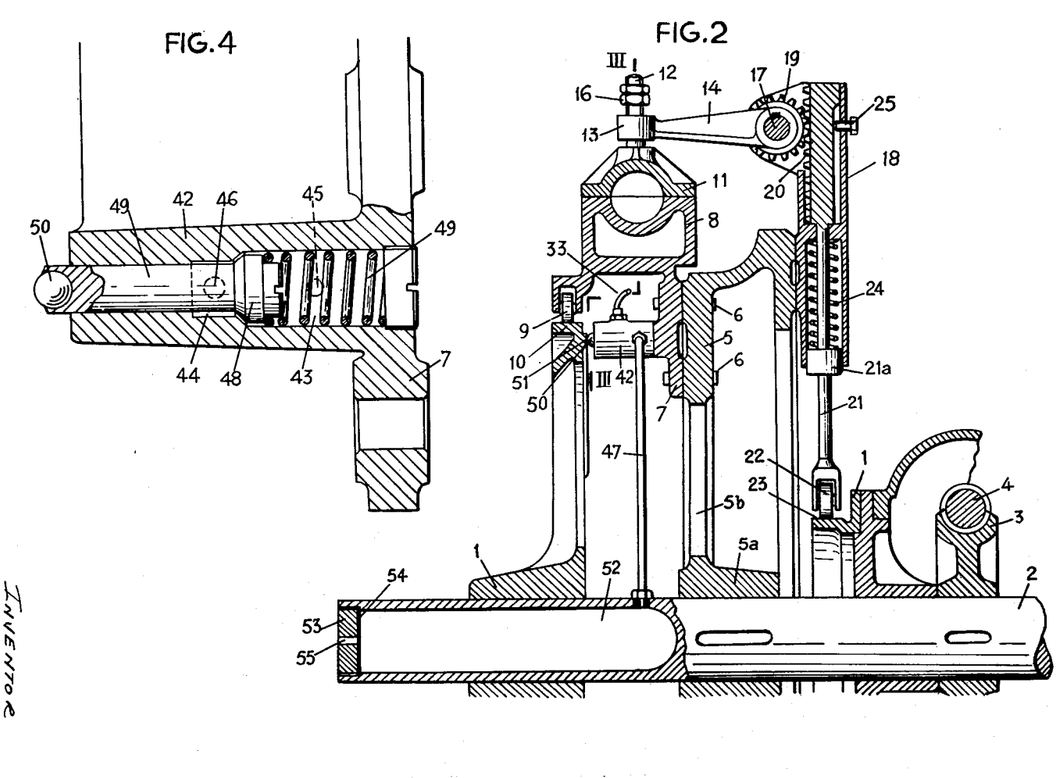
Figure 2 is a section on an enlarged scale on line II—II of Figure 1.
Figure 4 is a section on an enlarged scale on line IV—IV of Figure 3.

An extrusion press is positioned laterally of the above described machine. Figure 1 shows only the cylinder 56 of the extrusion press, which delivers the plastic material to an extrusion head 57, from which the material flows in the form of a tube 58.

Operation of the machine is as follows.

Figure 5:
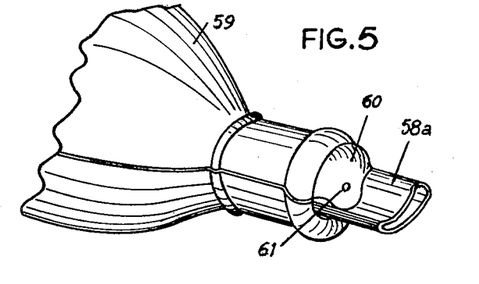
Figure 5 is a perspective view of part of one form of a hollow article manufactured by the method.

Assuming the machine shaft 2 to rotate in the direction of the arrow shown in Figure 1, the mould halves 8, 11 are closed under the action of the cam 23 on the tube 58 at A, the tube being plastic at the softening and melting temperature of the material and being pinched at both ends between the lateral ends 8a, 11a, and 8b, 11b of each half mold, the adjacent edges of which are formed as jaws. It can be seen that as the mold parts close, part 26b of support 26, Fig. 3, causes the tube 58 to be laterally displaced before the half molds 8 and 11 start clamping on the ends of the material. This lateral displacement of a portion of the tube 58 permits the needle 32 to penetrate the tube section along the axis of the half molds 8 and 11. Directly after closure of the moulds the rail 103 fixed to the framework 1 abuts the member 39 (Fig. 23) disengaging it from the head 37 of the stud 35 and allowing the lever 28a, 28b, which was in its lowered position, to snap back under the action of the spring 34 to the position shown in Figure 3, introducing the needle 32 into the chamber K through a bore defined by two notches 8c and 11c (Fig. 3a) in the adjacent edges of the parts 8b and 11b, respectively. Simultaneously the stationary cam 51 acts on the ball 50 and opens the valve 48 permitting flow of compressed air to the chamber 32 through the hoses 47, 33, tube 31b, conduit 31a and inner needle bore 32 into the chamber K. The compressed air expands the tube section 58 within the mould till it abuts the mould walls forming the desired hollow-article. The hollow body under gas pressure is cooled between the regions A and B, till the cam 51 closes the valve 48 under the action of the spring 49. Directly thereafter the needle 32 is withdrawn by abutting of the second fixed stop against the roller 29 which comes to the position 29' loading the return spring 34. The cam 23 then opens the mould 8—11, and the shaped article may be removed. It will be sufficient to cut the crushed tube length or flash 58a for obtaining the finished article, which is closed in front by a wall 60 (Figure 5) in which the needle 32 has left a small puncture 61.

It will be readily understood from the above description that hollow articles may be easily obtained from tubes of even very small diameter, since the needle penetrates along the axis of the tube section enclosed within the mould.

The size of the tube or blank 58 adapted to be blown is of the greatest importance for the article to be manufactured. The blank size directly determines the weight of the blown article and, when the weight should be reduced, the size of the blank should be decreased. This operation may be usefully accomplished by drawing the extruded tube before it is enclosed into the mould halves 8, 11, that is, by giving to the disc 5 a peripheral speed such as to exceed the linear speed of the tube extrusion. This obviously reduces the outer size of the tube while, as the needle is introduced and the air blown into the tubular body still with the greatest ease, the wall thickness is considerably decreased. With a given section of tubular body it is therefore possible to obtain a variable weight of the finished product starting from a maximum weight for an extrusion speed equalling the peripheral speed of the disc 5. If the number of articles to be obtained does not warrant the manufacture of a certain number of equal moulds, in order to obtain a series of fully equal articles, different moulds may be placed on the circular support. Since the weights of the different finished articles are also variable, the circular support is moved at a range of different speeds in order to produce the hollow body by steps of different larger or smaller size at the various moulds in which the tube section shall thereupon be enclosed. The above operation may further be carried out for the individual articles, for instance, when manufacturing a bottle, if the neck and walls are to be of the same thickness, the circular support shall be rotated at a higher speed when forming the neck which is of smaller external diameter, and at a lower speed when forming the bottle body, which is of larger diameter. The same result may be obtained by varying, when a particular mould or group of moulds is in seizing position, the extrusion speed of the machine preparing the tubular blank. The two above described operations may also be varied at the same time, that is, the extrusion speed of the machine producing the tubular blank, and the angular speed of the circular support retaining the stationary and movable mould sections producing the finished article.

Figure 6:
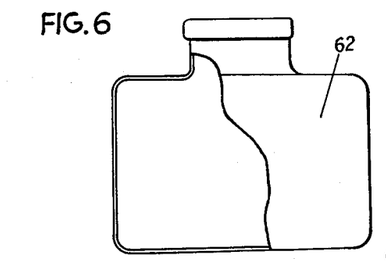
Figures 6 and 7 are a part sectional front and a plan view, respectively, of a hollow article of quadrangular section.
Figure 7:
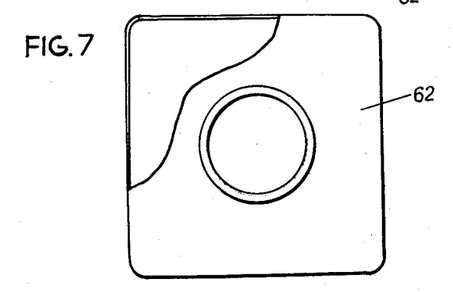
Figure 8:
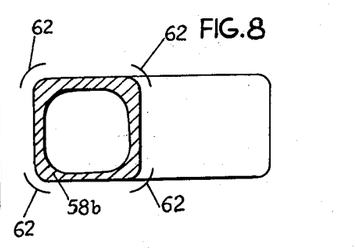
Figure 8 is a section of the tube employed for manufacturing the article shown in Figures 6 and 7.
Figure 9:
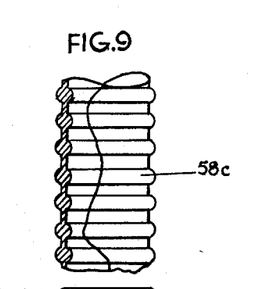
Figure 9 is a part sectional front view of a variable section tube.
Figure 10:
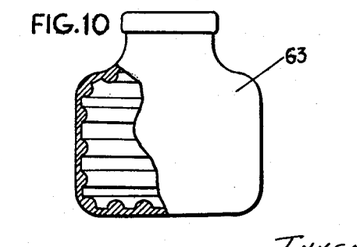
Figure 10 is a part sectional front view of an article obtained from the tube shown in Figure 9.

The section of the tubular blank produced by extrusion is also of greatest importance for the finished article. Apart from the circular section of the tubular blank, which is obviously best suited to the manufacture of bodies of revolution about the axis of the article to be manufactured, it has been ascertained that said section is always directly related to the section of the finished article. When it is desired to obtain a wall thickness as uniform as possible, it is obvious that the parts which during blowing should travel over a longer path, because they are more widely apart from the axis, should be of greater thickness, while the parts nearest to the axis should be of smaller thickness. In carrying out this principle, it should further be considered that during blowing of the tubular blank the walls of greater thickness oppose drawing most, while the parts of smaller thickness tend to expand more easily and rapidly. Consequently, the law of variations in thickness throughout the tubular blank is not directly related to the variation in thickness in the finished article. In order to assist uniformly drawing of the various walls during blowing, I utilize the fact that a thermoplastic material is more apt to be drawn, up to a certain limit, as its softening temperature is increased. The temperature of the parts to be blown by a greater extent is therefore increased. For instance, when a square bottle is to be manufactured from a tubular body, as shown by 62 in Figures 6 and 7, it will be sufficient to make the tubular body of a section as shown at 58b in Figure 8 and during extrusion or thereafter heat to a higher degree by means of supplementary heating means 62a the angles of the tubular body. For manufacturing articles of low weight and, consequently, inexpensive, but having a certain rigidity sufficient for the purpose in view, a tubular blank 58c (Figure 9) is used which is of variable cross sections so that in the finished articles 63, Figure 10, cross sections of great thickness are alternated with cross sections of very small thickness.

Figure 11:
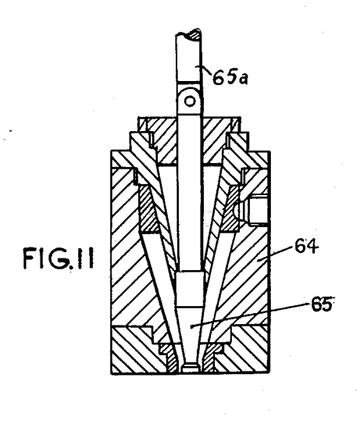
Figure 11 is a longitudinal section of the extrusion head for preparing the tube shown in Figure 9.

The tubular body 58c is obtained by means of an extrusion head 64, Figure 11, of which the hob 65 is of the shape illustrated in Figure 11 and receives an axial reciprocating motion, thereby varying the cross section of the extrusion die. The reciprocating motion is transmitted to the hob 65 by a rod 65a, to which the hob 65 is connected, said rod receiving its reciprocating motion from a device of any known type, driven by the extrusion apparatus. By flaring the hob of the extrusion head, a larger or smaller flow of extruded material, hence a larger or small thickness of the tubular body is obtained.

It will be obvious that the above described method may be combined with those described further above in order to vary the thickness of the tubular body and, consequently, the thickness of the final product.

Figure 12:
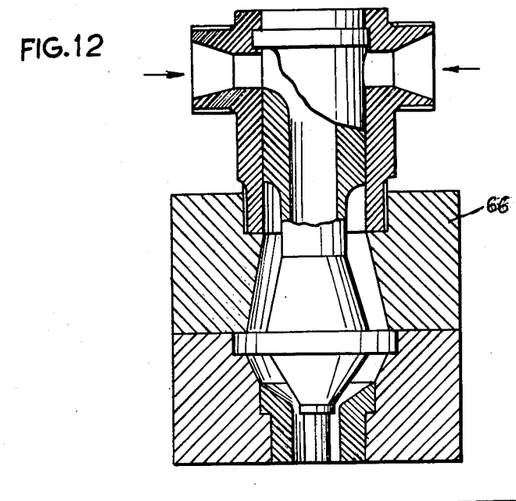
Figure 12 is a longitudinal section of an extrusion head for preparing tubes made of two materials of different characteristics.
Figure 13:
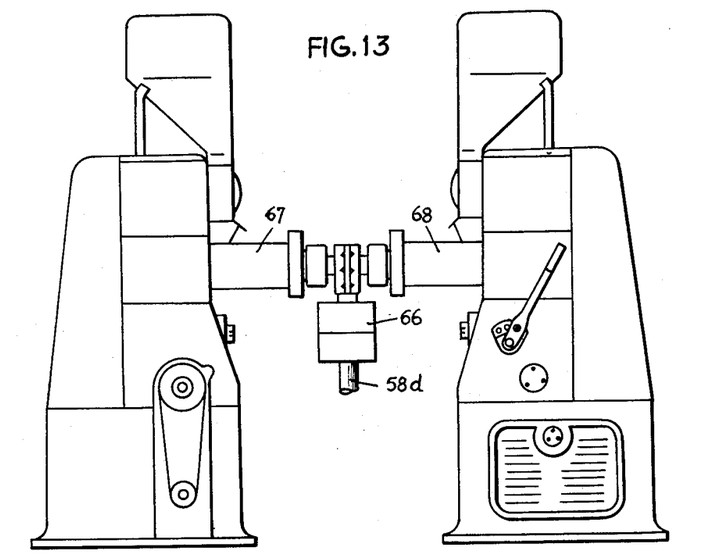
Figure 13 is a front view of a machine for extruding tubes employing the head shown in Figure 12.
Figure 14:
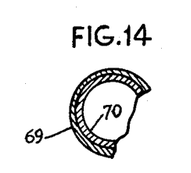
Figure 14 is a cross sectional view of a tube prepared on the machine shown in Figure 13.

With the above described method it is further possible to obtain blown articles having walls comprising two or more superposed materials. In fact, if the tubular blank is produced, for instance, by means of the extrusion head 66, Figures 12 and 13, in which two different materials delivered by two extrusion presses 67, 68 are coupled during extrusion, whereby a double tubular blank 58d is obtained, during the blowing stage both materials are caused to fit together against the mould walls, which results in the blank shown in Figure 14, composed of two walls 69, 70 firmly connected together.

If the various materials in the number of two or more, may be welded to one another, a single body is obtained; otherwise, two or more distinct bodies result, which are of the same shape. It is therefore possible to usefully combine various characteristics of different materials, in order to suit them to well determined purposes in view, both in respect of price and use. For instance, while polyethylenic resins satisfactorily withstand most of corrosive agents, their strength against shocks or rubbing is considerably lower than that of polystyrolic or cellulosic resins which, while they are easily attacked by chemical agents and solvents, satisfactorily withstand rubbing and shocks. Consequently, excellent results are obtained by combining both materials in manufacturing, for instance, hollow bodies for use as containers for chemical agents.

Figure 15:
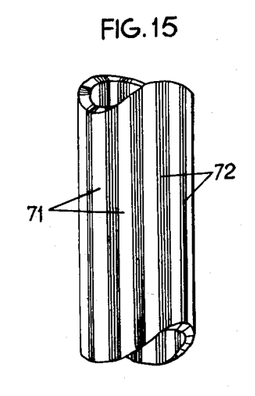
Figure 15 shows a tube having longitudinal zones of different characteristics.
Figure 16:
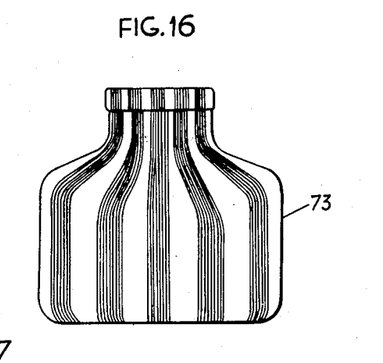
Figures 16 and 17 are front and a part-view from underneath, respectively, of an article obtained from the tube shown in Figure 15.
Figure 17:
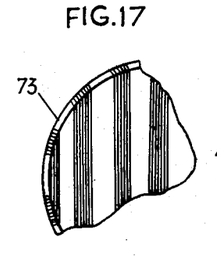
Figure 18:
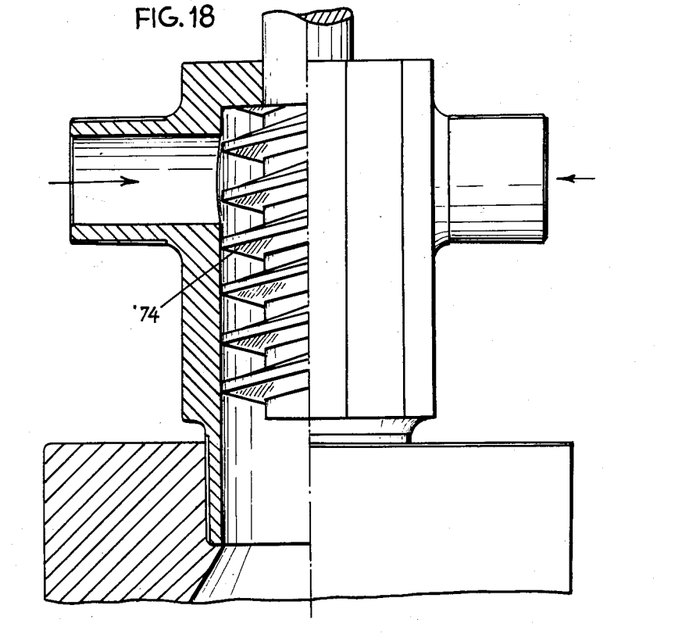
Figure 18 shows in part in elevation and in part in longitudinal section, a mixing device which may be placed ahead of the extrusion press.

By utilizing two or more extrusion presses and materials of the same kind but differing in color, it is possible to obtain finished articles of a highly ornamental character by making up the tubular blank of longitudinal regions 71, 72 of various colours (Figure 15), said regions being enlarged in the finished articles, as indicated by 73 in Figures 16 and 17. It is further possible, by properly mixing together two or more materials from the extrusion presses, to obtain variegated articles from materials differing in color; for this purpose the materials are previously mixed within a hopper having a stationary screw 74 (Figure 18) before introducing them into the extrusion head.

Further details concern the gas to be filled into the tubular body. It has been ascertained that it is convenient to employ an inert gas which does not combine with the material and, in order to assist the finished article in cooling, the gas should be saturated with moisture, in order to utilize for cooling the vaporization heat evolved when gas comes into contact with the hot walls of the tubular blank.

What I claim is:

1. In an apparatus for making hollow plastic articles, a sectional mold comprising a pair of complementary mold halves adapted to be opened and closed and defining a mold cavity having a longitudinal axis adapted to receive an elongated tubular length of softened plastic material, means on said mold halves adjacent one end of the mold cavity for collapsing and sealing the tubular plastic material when the mold is closed, jaw means on said mold halves at the opposite end of the mold cavity for collapsing the tubular material, said jaw means providing in the closed position of the mold an end opening in the mold on said longitudinal axis, fluid injector means including a hollow needle supported for axial movement adjacent said opposite end of the mold cavity, and actuating means for effecting back and forth axial shifting movement of said needle, said actuating means including snap action spring means for projecting the needle forcibly through said end opening in the mold whereby to pierce the collapsed tubular material at said opposite end of the mold cavity for introducing an expanding fluid.

2. In an apparatus for making hollow plastic articles, a sectional mold comprising a pair of complementary mold halves adapted to be opened and closed and defining a mold cavity having a longitudinal axis adapted to receive an elongated tubular length of softened plastic material, means on said mold halves adjacent one end of the mold cavity for collapsing and sealing the tubular plastic material when the mold is closed, jaw means on said mold halves at the opposite end of the mold cavity for collapsing the tubular material, said jaw means providing in the closed position of the mold an end opening in the mold on said longitudinal axis, fluid injector means including a hollow needle supported for axial movement adjacent said opposite end of the mold cavity, and actuating means for effecting back and forth axial shifting movement of said needle, said actuating means including releasable detent means for retaining said needle in retracted position exteriorly of the mold cavity when the mold is open and snap action spring means for forcibly projecting said needle through said opening in the mold whereby to pierce the collapsed tubular material at said opposite end of the mold cavity for introducing an expanding fluid.

3. In an apparatus for making hollow plastic articles, a sectional mold comprising a pair of complementary mold halves adapted to be opened and closed and defining a mold cavity having a longitudinal axis adapted to receive an elongated tubular length of softened plastic material, means on said mold halves adjacent one end of the mold cavity for collapsing and sealing the tubular plastic material when the mold is closed, jaw means on said mold halves at the opposite end of the mold cavity for collapsing the tubular material, said jaw means providing in the closed position of the mold an end opening in the mold on said longitudinal axis, a needle support extending rigidly and axially from the mold adjacent said opposite end of the mold cavity, a hollow needle shiftably mounted on said support for movement along said longitudinal axis, actuating means pivotally mounted on the mold and having an operating connection with said needle for effecting back and forth shifting movement of the needle, a spring pressed detent coacting with said actuating means for releasably retaining the needle in one position on said support in retracted relation with respect to the mold cavity, and spring means operatively coacting with said pivotally mounted actuating means for urging the needle into the mold cavity whereby upon release of said detent the needle is forcibly shifted under the action of said spring means to an opposite position on said support and is thereby forcibly projected through said end opening in the mold for penetrating the collapsed tubular plastic material at said opposite end of the mold cavity for introducing an expanding fluid.

4. In an apparatus for making hollow plastic articles, a sectional mold comprising a pair of complementary mold halves adapted to be opened and closed and defining a mold cavity having a longitudinal axis adapted to receive an elongated tubular length of softened plastic material, means on said mold halves adjacent one end of the mold cavity for collapsing and sealing the tubular plastic material when the mold is closed, jaw means on said mold halves at the opposite end of the mold cavity for collapsing the tubular material, said jaw means providing in the closed position of the mold on end opening in the mold on said longitudinal axis, a needle support extending rigidly and axially from the mold adjacent said opposite end of the mold cavity, a hollow needle shiftably mounted on said support for movement along said longitudinal axis, bell crank means pivotally supported on the mold and including a pair of angularly extending arms, one of said arms having an operating connection with said needle for effecting back and forth shifting movement thereof and the other of said arms being adapted to be actuated for rocking the bell crank means in one direction for shifting the needle to retracted position with respect to the mold cavity, releasable detent means cooperable with said other arm for releasably retaining the needle in retracted position, and spring means coacting with said other arm for rocking said bell crank means in the opposite direction whereby upon release of said detent means the needle is forcibly projected through said end opening in the mold for penetrating the collapsed tubular plastic material at said opposite end of the mold cavity for introducing and expanding fluid.

5. In an apparatus for making hollow plastic articles, a sectional mold comprising a pair of complementary mold halves adapted to be opened and closed and defining a mold cavity having a longitudinal axis adapted to receive an elongated tubular length of softened plastic material, means on said mold halves adjacent one end of the mold cavity for collapsing and sealing the tubular plastic material when the mold is closed, jaw means on said mold halves at the opposite end of the mold cavity for collapsing the tubular material, said jaw means providing in the closed position of the mold an end opening in the mold on said longitudinal axis, a needle support extending rigidly and axially from the mold adjacent said opposite end of the mold cavity, a hollow needle shiftably mounted on said support for movement along said longitudinal axis, a crank support extending rigidly from the mold, bell crank means pivotally mounted on said crank support and including a pair of angularly extending arms, one of said arms having an operating connection with said needle for effecting back and forth shifting movement of the needle and the other of said arms being adapted to be actuated for rocking the bell crank means in one direction for shifting the needle to retracted position with respect to the mold cavity, said other arm having an aperture therein, a stud member extending rigidly from the mold through said aperture, spring pressed releasable detent means disposed at one side of said other arm and coacting with the outer end portion of said stud member for releasably retaining the needle in retracted position, and a spring surrounding said stud member and coacting with the opposite side of said other arm for rocking the bell crank means in the opposite direction whereby upon release of said detent means the needle is forcibly projected through said end opening in the mold for penetrating the collapsed tubular material at said opposite end of the mold cavity for introducing an expanding fluid.

6. The structure of claim 3 further characterized in that one of said mold halves is arranged for opening and closing movement relative to the other mold half, and said needle support is rigidly mounted on said one mold half and is arranged to overlap the other mold half and the longitudinal axis of the mold cavity when the mold is closed whereby said needle support also functions as a displacing member for effecting relative lateral displacement between the portion of the tubular plastic material contained in the mold cavity and a portion of said material extending beyond said opposite end of the mold cavity.

References Cited in the file of this patent

UNITED STATES PATENTS

| | | |
|---|---|---|
| 1,052,081 | Miltner | Feb. 4, 1913 |
| 1,933,212 | Gora | Oct. 31, 1933 |
| 2,017,806 | Riggs et al. | Oct. 15, 1935 |
| 2,050,214 | Stephens | Aug. 4, 1936 |
| 2,138,378 | Johnson | Nov. 29, 1938 |
| 2,444,831 | Kilborn | July 6, 1948 |
| 2,515,093 | Mills | July 11, 1950 |